C. LEROY.
Attaching Horses to Vehicles.
No. 82,852.
Patented Oct. 6, 1868.
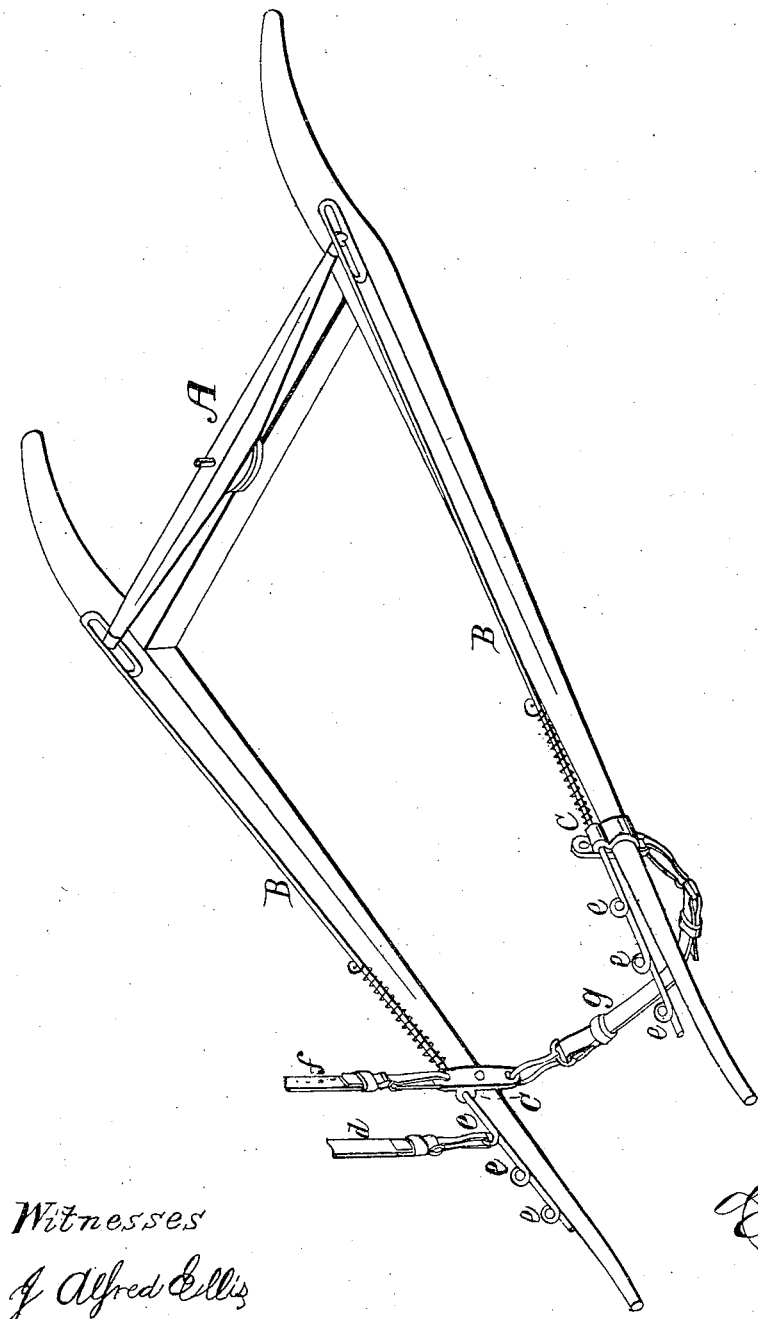
Witnesses
J. Alfred Ellis
J. W. Wister
Inventor
C. Leroy
Per
T. H. Alexander
attys.

United States Patent Office.

CHARLES LEROY, OF MEXICO, NEW YORK.

Letters Patent No. 82,852, dated October 6, 1868.

---

IMPROVEMENT IN APPARATUS FOR ATTACHING HORSES TO VEHICLES.

---

The Schedule referred to in these Letters Patent and making part of the same.

---

TO ALL WHOM IT MAY CONCERN:

Be it known that I, CHARLES LEROY, of Mexico, in the county of Oswego, and State of New York, have invented certain new and useful Improvements in Devices for Attaching Horses to Vehicles; and I do hereby declare that the following is a full, clear, and exact description thereof, reference being had to the accompanying drawings, and to the letters of reference marked thereon, which form a part of this specification, and in which is represented a perspective view of my invention.

The object of this invention is to provide a suitable means for attaching horses to vehicles, whereby the strain on the draught-bar is diminished, and the sudden jerking motion, caused by the starting and stopping of the horse, avoided; and to this end my invention consists in the employment of two metal bars or rods, having their inner ends looped and attached to the draught-bar, and passing through clips or supports, secured to the outer end of the shafts of the vehicle, and provided with spiral springs and eyes or loops, substantially in the manner and for the purpose hereinafter set forth.

To enable others skilled in the art to which my invention appertains to make and use the same, I will now describe its construction and operation.

In the accompanying drawing is represented an ordinary pair of shafts for vehicles, to the cross-piece of which is pivoted the draught-bar A.

B B designate two metal bars or rods, provided at their inner ends with loops, into which fit and slide projections on the outer ends of the draught-bar A, and extending outwards nearly the whole length of the shafts.

At the outer ends of these rods is formed or secured a number of eyes or loops, e, into which buckle straps, d, for securing or attaching the horse to the rods B.

C represents clips, which are made as seen in the accompanying drawing, and embracing the shafts near their outer ends, and provided with openings, through which pass the rods B, each of the ends of their vertical portions being furnished with holes, into which buckle straps, or the back and belly-bands f and g.

D represents springs, placed spirally on the rods B, to which they are secured at one end, their opposite ends resting against the clips C C on the shafts of the vehicle. By means of these springs, the rods, to which the horse is attached when started or stopped, will be allowed to operate smoothly, and also lessen the strain on the draught-bar, owing to the resistance they offer to the rods when operated upon or drawn forward, thereby preventing a jerking motion from being communicated to the draught-bar.

What I claim, and desire to secure by Letters Patent, is—

1. The clips C C, constructed as described, and secured to the shafts of the vehicle as and for the purpose described.

2. Draught-bar A, rods or traces B B, spiral springs D D, and clips C C, all combined, arranged, and operating substantially as and for the purpose set forth.

In testimony that I claim the foregoing as my own, I affix my signature in presence of two witnesses.

CHARLES LEROY.

Witnesses:
    L. D. SMITH,
    H. HALSEY.